United States Patent [19]

Kurakake et al.

[11] Patent Number: 4,885,515
[45] Date of Patent: Dec. 5, 1989

[54] VELOCITY CONTROL APPARATUS

[75] Inventors: Mitsuo Kurakake, Hino; Keiji Sakamoto, Hachioji, both of Japan

[73] Assignee: Fanuc Ltd., Minamitsuru, Japan

[21] Appl. No.: 231,851

[22] PCT Filed: Dec. 11, 1987

[86] PCT No.: PCT/JP87/00966
§ 371 Date: Jul. 28, 1988
§ 102(e) Date: Jul. 28, 1988

[87] PCT Pub. No.: WO88/04493
PCT Pub. Date: Jun. 16, 1988

[30] Foreign Application Priority Data

Dec. 12, 1986 [JP] Japan .................. 61-296386

[51] Int. Cl.$^4$ .......................................... G05B 19/28
[52] U.S. Cl. ..................... 318/567; 318/603; 318/565; 318/568.11; 364/513; 388/800; 388/912; 901/15; 901/23
[58] Field of Search ................ 318/565–574, 318/594, 604, 603, 605, 606, 607, 608, 611, 612, 613, 614, 615, 616, 617, 618, 619, 620, 636; 364/513, 167, 183; 901/9, 15, 19, 20–24; 388/800–860

[56] References Cited

U.S. PATENT DOCUMENTS

| | | | |
|---|---|---|---|
| 4,201,937 | 5/1980 | Irie | 318/568.11 |
| 4,297,624 | 10/1981 | Komiya | 318/625 X |
| 4,330,832 | 5/1982 | Kohzai et al. | 318/571 X |
| 4,420,812 | 12/1983 | Ito et al. | 364/513 |
| 4,424,472 | 1/1984 | Jacot-Descombes et al. | 318/568.13 |
| 4,504,772 | 3/1985 | Matsuura et al. | 318/569 X |
| 4,575,665 | 3/1986 | Matsuura et al. | 318/565 X |
| 4,602,196 | 7/1986 | Matsui | 318/603 |
| 4,611,155 | 9/1986 | Kurakake | 318/603 |
| 4,629,956 | 12/1986 | Nozawa et al. | 318/616 X |

Primary Examiner—William M. Shoop, Jr.
Assistant Examiner—Paul Ip
Attorney, Agent, or Firm—Staas & Halsey

[57] ABSTRACT

A velocity control apparatus according to the invention is used in order to acccept feedback data, for velocity control of a servomotor or the like. The disclosed apparatus provides velocity information in the form of discrete data from a pulse coder or the like, and forms a prescribed control command by digitally processing the data in a microprocessor. In a case where the above mentioned data are sampled at a predetermined sampling rate during a processing period so as to accommodate processing by the microprocessor, a lag element results when the data are accepted within the computer as velocity information which causes an inaccuracy in servomotor control. Accordingly, a detection signal forming unit (5) processes the discrete count data as the sum of count data synchronized to the sampling rate which is the processing period subdivided into a fraction, in which fraction the denominator is an integer. The detection signal forming unit (5) supplies a velocity processing block (3b) with velocity data, at the predetermined sampling rate, as the latest velocity data. Thus, the influence of the lag element can be reduced to a great extent and the capability of the microprocessor can be made to fully manifest itself, thereby enabling accurate velocity control.

6 Claims, 3 Drawing Sheets

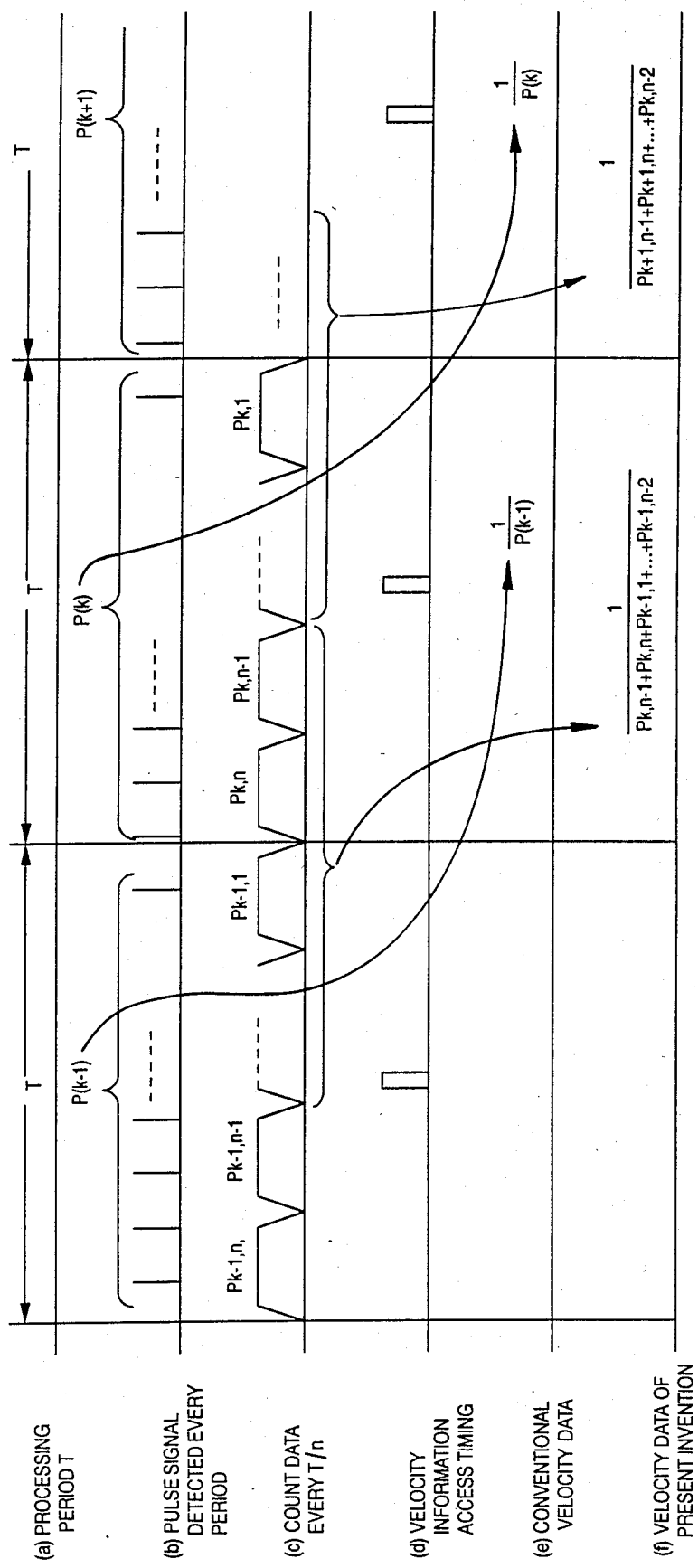

VELOCITY CONTROL APPARATUS

BACKGROUND OF THE INVENTION

1. Field of the Invention

This invention relates to a velocity control apparatus for controlling the velocity of a servomotor based on a velocity signal feed back from the servomotor.

2. Description of the Related Art

Servomotors for NC machine tools, robots and the like often employ a control method which relies more upon a digital servo system, in which digital processing is executed based on digital commands, rather than upon an analog system.

FIG. 3 is a block diagram illustrating an example in which a servomotor is controlled by such a digital system. A command signal formed by a host system such as a computer is applied to a digital controller b. The digital controller b includes by a pulse shaper and direction discriminating circuit b1, a deviation counter b2, and a D/A converter b3. A position signal detected by a pulse coder e mounted on a servomotor d is fed back to the digital controller b, so that a deviation signal between the detected position signal and the input command signal may be formed. The deviation signal is converted into an analog signal by the D/A converter b3, and the analog signal is delivered to a velocity control unit c. The velocity control unit c includes by a velocity controller c1 and a current controller c2. The velocity controller c1 obtains a current command signal by comparing a velocity signal fed back from a tachogenerator f with the analog value of the deviation signal, and applies the current command signal to the current controller c2. The current controller c2 receives current feedback from the servomotor and, by comparing this current with the current signal obtained by the velocity controller c1, forms a drive control signal for the servomotor d.

In general, therefore, the velocity control unit c includes a velocity control loop and a current control loop composed of analog circuitry which performs processing to produce the servomotor drive control signal. With the recent popularization of 16-bit microcomputers, however, digital servo systems have been developed in which all processing for such velocity control and current control is performed digitally.

The reason for the latter is that many advantages are obtained in terms of control precision, system cost and the like when the servo control system, inclusive of the velocity control loop and current control loop, is composed entirely of digital circuitry. However, a computer that comprises such a servo system includes software and is required to store parameters for servo system gain adjustment, velocity loop compensation and the like in a memory. The computer is also required to carry out various processing control with regard to the processing of feedback data such as velocity signals and position signals after sampling, at a prescribed period, and with regard to information actually generated by a signal detecting mechanism such as the pulse coder. Accordingly, a problem that arises is a delay in such signal processing even is a 16-bit microprocessor having a high processing capability is used. The reason is that when the above mentioned data are sampled at a predetermined sampling rate so as to accommodate the processing performed by the microprocessor, a lag element results when the data are accepted within the computer as velocity information and thereby causes an inaccuracy in servomotor control.

SUMMARY OF THE INVENTION

The present invention has been deviced to solve the aforementioned problem and its object is to provide a velocity control apparatus capable of reducing lag due to the sampling of velocity information necessary for controlling the velocity of a servomotor.

In accordance with the present invention, there is provided a velocity control apparatus for forming discrete velocity information using a pulse signal fed back from a servomotor and for controlling the velocity of the servomotor. The velocity control apparatus comprises sampling means for accepting the pulse signal at a sampling rate stipulated by a processing period of the velocity information; counting means for counting a number of pulses in synchronism with the sampling rate, the pulses being fed back in a length of time which is equivalent to the processing period divided by an integer; memory means for storing plural items of count data in the conting means corresponding to the sampling processing, the data being stored while being successively updated with the most recent data; and arithmetic means for summing a predetermined number of the count data from the memory means and supplying the result as velocity information to a velocity control arithmetic unit.

Accordingly, the velocity control apparatus of the present invention obtains a servomotor position signal from a detector such as a pulse coder and detects discrete count data. When information is digitally outputted to a velocity control loop as well as to a position control loop, a plurality of the latest items of count data corresponding to the sampling rate are treated as velocity information.

This servomotor velocity control apparatus which implements the velocity control loop using digital signals is capable of using count data corresponding to the latest time of sampling by counting pulses within a length of time equivalent to the sampling period divided by an integer. As a result, velocity information free of the conventional time delay can be obtained in order to realize more accurate velocity control.

BRIEF DESCRIPTION OF THE DRAWINGS

FIG. 2 is a characteristic diagram for describing the actions of the foregoing embodiment.

DESCRIPTION OF THE PREFERRED EMBODIMENT

An embodiment of the present invention will now be described in detail with reference to the drawings.

Figure 1A:
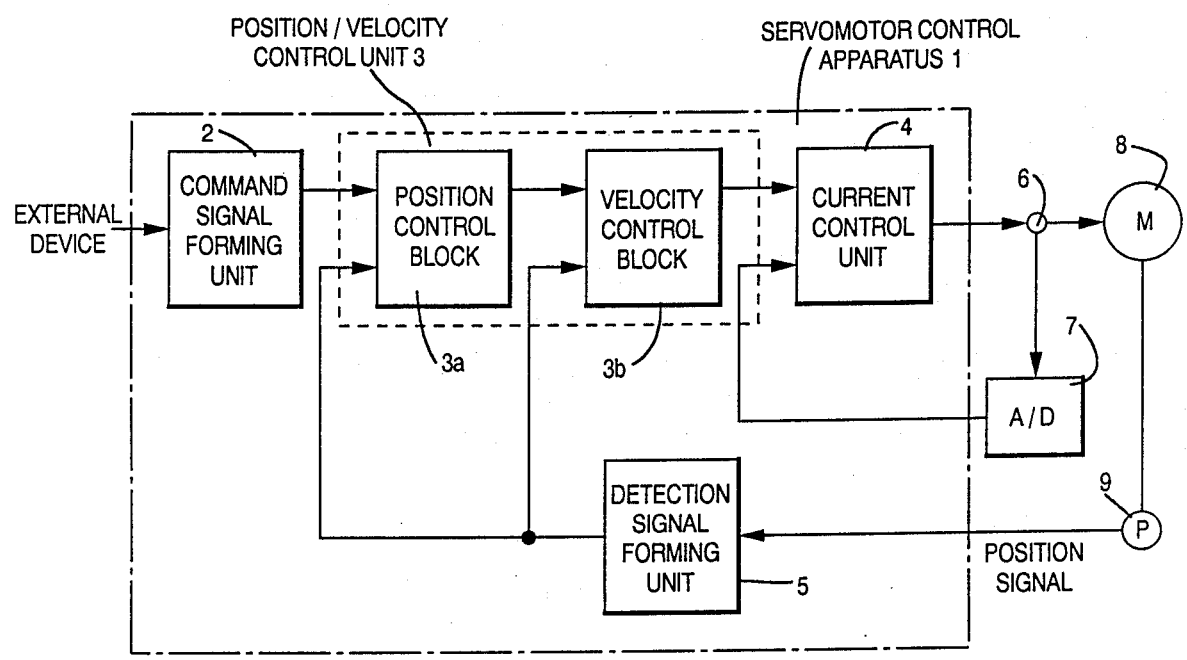
FIGS. 1(a) and (b) are block diagrams illustrating the general construction of a servomotor velocity control apparatus to which the present invention is applied.

FIG. 1a shows block a diagram illustrating the general construction of a servomotor velocity control apparatus to which the present invention is applied.

A servomotor velocity control apparatus 1 is comprises a microprocessor and is provided with a command signal forming unit 2, a position/velocity control unit 3, a current control unit 4 and a detection signal forming unit 5. Each of these control units is constructed by suitably arranging a CPU, a memory, a parallel I/O, a bus line and the like.

The current of a servomotor 8 is subjected to current control loop processing by converting an analog value detected by a detector 6 into a digital value by means of an A/D converter 7. The converted digital value is thereafter inputted to the current control unit 4 as a current feedback signal. A pulse signal obtained by a detector 9 such as a pulse coder mounted on the servomotor 8 is inputted to the detection signal forming unit 5 as a position signal. The detection signal forming unit 5 delivers the position signal and a velocity signal as discrete count data to a position control block 3a and a velocity control block 3b respectively of the position/velocity control unit 3. A position control loop and velocity control loop are thereby formed.

Figure 1B:
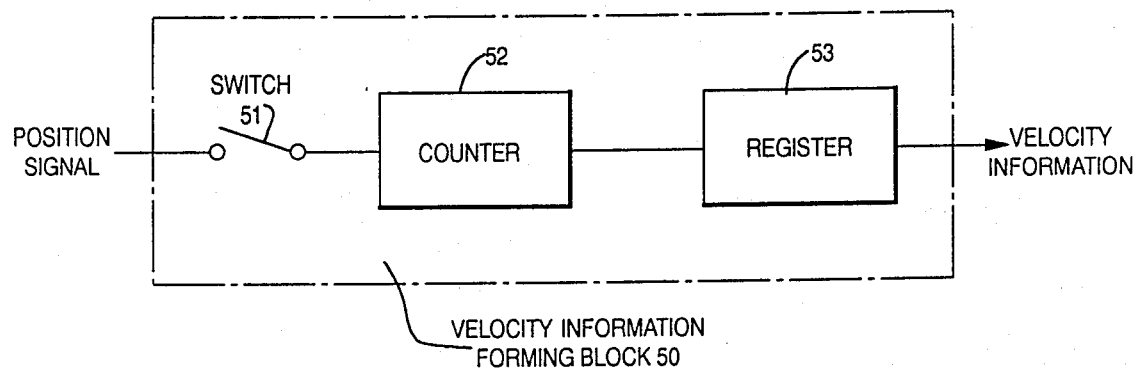
Figure 3:
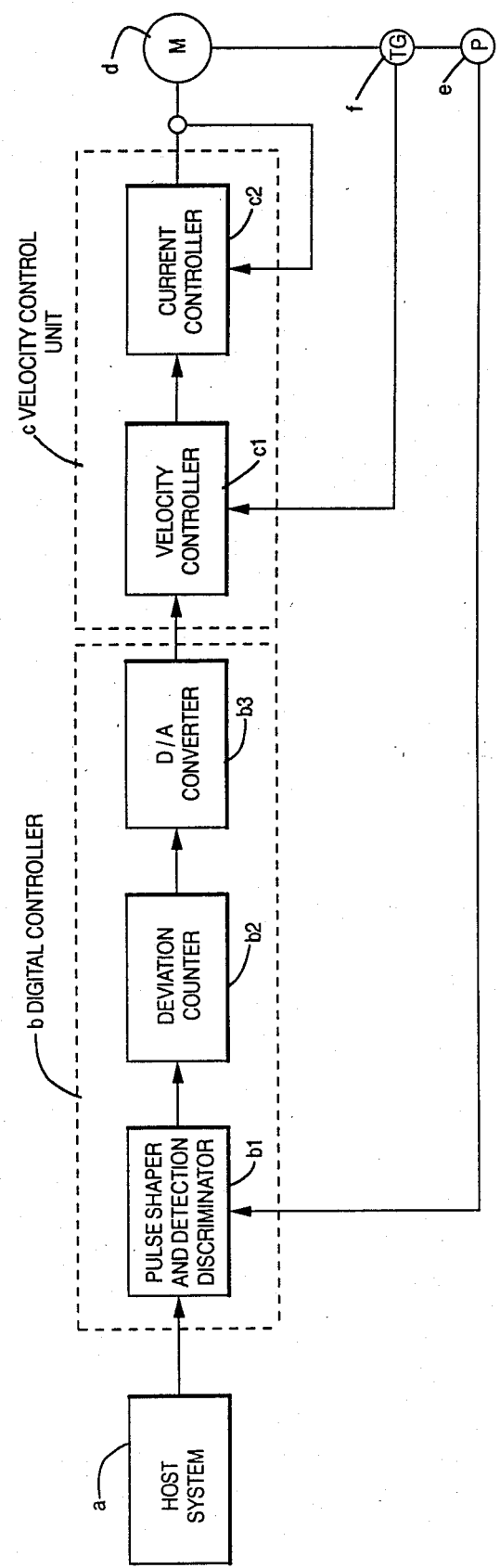
FIG. 3 is a block diagram illustrating an example of a conventional apparatus.

A velocity information forming block 50 of the kind shown in FIG. 1(b) is provided within the detection signal forming unit 5. A software switch 51, a counter 52 and a register 53 are disposed in the velocity signal forming block 50, from which a velocity information signal is provided at a time interval or sampling rate set by the switch 51. Sampled pulses received from detector 9 are outputted to the position control block 3a as a position signal and also supplied to the counter 52. These pulses are counted in synchronization with a predetermined processing period T and subdivided into a number of pulses (sampling rate) to be fed back to the velocity control block 3b as the velocity information signal in units of time for example, (T/4), namely one-fourth the processing period. the output of the counter 52 is delivered to the register 53. After the counted value for the predetermined processing period T is stored in the register 53, the counter value is cleared by successively updating the stored of count data to include the most recent of the sampled pulses from detector 9.

The number of detected pulses is counted in synchronization with the processing period T at every sampling processing period T at every sampling time (T/n) obtained by dividing the processing period T by an integer (n). Torque information is successively outputted to the current control unit 4, processed and provided by the velocity control block 3b in accordance with the velocity information signal. At such time, the velocity information signal is obtained based on n items of count data corresponding to the latest sampling time. This processing is carried out as shown in FIG. 2.

The operation of the foregoing embodiment will now be described with reference to the characteristic view of FIG. 2 while being compared with the conventional method.

(a) indicates the processing period T, which is stipulated by the processor, for sampling the pulse signal obtained by the pulse coder 9 provided on the servomotor 8.

(b) indicates the number of detected pulses P(k=1),P(k), P(k+1) . . . obtained in each processing period (where k is an integer).

(c) indicates the number of count data pulses, which are synchronized to the processing period and occur every T/n of the processing period T (where n is any integer).

(d) indicates access timing of the computer side with regard to detected velocity information. In the prior art, all pulses in one processing period stipulated by processing of the velocity control block 3b are counted, after which the results of the count are outputted. Accordingly, these results are accessed by the velocity control block 3b at the predetermined timing of the next processing period, so that the signal from the pulse coder 9 is processed as information delayed in time by a maximum of (T+T/2).

(e) indicates conventional velocity data, which is determined by the number of pulses counted within the processing period T. The velocity information being proportional to 1/P(k−1), 1/P(k), 1/P(k+1), and each respectively delayed by the maximum of (T+T/2).

(f) According to the present invention, when velocity control processing is carried out by referring to the number of pulses stored in the register 53, (f) indicates velocity data which includes the addition of plural items of stored count data occuring every T/n and corresponding to the latest processing period T at that instant. Consequently, the conventional time delay at signal processing performed every processing period is reduced.

Depending a count data V1 counted in the latest sampling period from the pulse signal of the pulse coder, as described above, it is possible to perform suitable weighting processing with regard to a count data V2 stored in the register 53. That is, if velocity is slow, for example, accurate velocity control can be carried out by obtaining velocity information as $[(V1+V2)/2]$.

Though an embodiment of the present invention has been described, the invention is not limited thereto but can be modified in various ways without departing from the scope of the claims.

The velocitu control apparatus of the present invention is used in order to accept feedback data, which is necessary for velocity control of a servomotor or the like, in the form of discrete data from a pulse coder or the like, and form a prescribed control command by digitally processing the data in a microprocessor.

We claim:

1. A velocity control apparatus forming discrete velocity information by receiving and processing a pulse signal fed back from a servomotor for controlling the velocity of the servomotor, comprising:
   velocity control arithmetic means, connected to the servomotor, for generating a velocity control signal to control the servomotor;
   sampling means for receiving and sampling the pulse signal at a sampling period corresponding to a processing period of said velocity information; received and sampled pulses occurring in a length of time which is equivalent to the processing period divided by an integer;
   memory means for storing plural items of count data corresponding to the received and sampled pulses counted during the sampling period by said counting means, the count data being stored by said memory means while being successively updated with a most recent count data; and
   arithmetic means for adding a predetermined number of the count data from said memory means and supplying a result of the addition as velocity information to said velocity control arithmetic means.

2. A velocity control apparatus according to claim 1, wherein said arithmetic means comprises means for weighting and processing the count data occurring in a latest sampling period and the count data from said memory means as velocity information.

3. A velocity control apparatus according to claim 1, wherein said velocity control apparatus comprises a microcomputer forming a software servo system.

4. A velocity control apparatus according to claim 1, wherein the sampling period of said sampling means comprises one-fourth of the processing period, whereby discrete velocity information is formed.

5. An apparatus generating control signals for controlling a servomotor during a processing period, said apparatus comprising:
   a pulse coder connected to the servomotor and generating a position signal having pulses corresponding to a rotational position of the servomotor;
   counter means for counting the pulses of said position signal at a predetermined sampling rate and generating count data corresponding to the counted pulses;
   register means receiving the count data for storing and successively providing the stored count data in accordance with said predetermined sampling rate; and
   arithmetic means for summing a predetermined number of the most recent occurring count data and providing an inverse sum value as the control signals.

6. An apparatus according to claim 5, wherein said apparatus comprises a microcomputer and said predetermined sampling rate comprises a time equal to a fraction of the processing period.

* * * * *

UNITED STATES PATENT AND TRADEMARK OFFICE
CERTIFICATE OF CORRECTION

PATENT NO. : 4,885,515

DATED : December 5, 1989

INVENTOR(S) : Mitsuo Kurakake et al.

It is certified that error appears in the above-identified patent and that said Letters Patent is hereby corrected as shown below:

On the title page:

[57] Abstract, line 2, "acccept" s/b --accept--.

Col. 1, line 16, after "digital" insert --servo--;

line 37, after "current" (2nd occurrence) insert --command--.

Col. 2, line 5, "deviced" s/b --devised--;

line 22, "conting" s/b --counting--, delete "sam-";

line 23, delete "pling";

line 47, "(b)" s/b --1(b)--;

line 62, delete "is".

Col. 3, line 29, "the" (2nd occurrence) s/b --The--;

line 32, "counter" s/b --counted--;

line 33, delete "of";

line 38, delete "processing period T at every samling";

line 62, delete "side".

UNITED STATES PATENT AND TRADEMARK OFFICE
CERTIFICATE OF CORRECTION

PATENT NO. : 4,885,515

DATED : December 5, 1989

INVENTOR(S) : Mitsuo Kurakake et al.

It is certified that error appears in the above-identified patent and that said Letters Patent is hereby corrected as shown below:

Col. 4, line 15, "at" s/b --in--;
line 18, after "Depending" insert --upon--;
line 29, "velocitu" s/b --velocity--.

Signed and Sealed this

Nineteenth Day of February, 1991

Attest:

HARRY F. MANBECK, JR.

*Attesting Officer*  *Commissioner of Patents and Trademarks*